(12) United States Patent
Sang

(10) Patent No.: US 6,444,345 B2
(45) Date of Patent: Sep. 3, 2002

(54) FUEL CELL SYSTEM

(75) Inventor: Jochen Sang, Kirchheim/Teck (DE)

(73) Assignee: Xcellsis GmbH, Kirchheim/Teck-Nabern (DE)

( * ) Notice: Subject to any disclaimer, the term of this patent is extended or adjusted under 35 U.S.C. 154(b) by 29 days.

(21) Appl. No.: 09/761,660

(22) Filed: Jan. 18, 2001

(30) Foreign Application Priority Data

Jan. 18, 2000 (DE) ......................................... 100 01 717

(51) Int. Cl.[7] .................................................. H01M 8/04
(52) U.S. Cl. ............................................ 429/34; 429/17
(58) Field of Search ............................. 429/12, 13, 17, 429/20, 22, 34, 26

(56) References Cited

U.S. PATENT DOCUMENTS

| | | | | |
|---|---|---|---|---|
| 5,611,203 A | * | 3/1997 | Henderson et al. | ......... 60/605.2 |
| 5,919,582 A | * | 7/1999 | Pedicini et al. | ............... 429/27 |

FOREIGN PATENT DOCUMENTS

| | | | | |
|---|---|---|---|---|
| EP | 0 456 931 B1 | | 9/1990 | |
| WO | US98/01462 | * | 1/1998 | .......... F02M/25/07 |
| WO | WO 98/32964 | | 6/1998 | |

* cited by examiner

Primary Examiner—Carol Chaney
Assistant Examiner—Donald V. Scaltrito
(74) Attorney, Agent, or Firm—Crowell & Moring LLP

(57) ABSTRACT

A fuel cell system includes at least one fuel cell unit which is accommodated in a fuel cell enclosure. A cathode gas delivery line, cold-start gas delivery line, a cathode off-gas return line, anode off-gas return line may also be provided. According to the invention, the system is equipped with at least one Coanda flow amplifier in order to amplify the air stream for the purpose of ventilating the fuel cell enclosure, a cathode gas stream, a cold-start gas stream, a recirculated cathode off-gas stream or a recirculated anode off-gas stream. The may be equipped with a ventilating means for a housing outside the fuel cell enclosure. In the housing are components of the fuel cell system, said ventilating means including a Coanda flow amplifier.

6 Claims, 2 Drawing Sheets

FUEL CELL SYSTEM

BACKGROUND AND SUMMARY OF THE INVENTION

This application claims the priority of German patent document 100 01 717.7, filed Jan. 18, 2000, the disclosure of which is expressly incorporated by reference herein.

The present invention relates to a fuel cell system having one or more fuel cell units inserted into a fuel cell box. Allocated to the fuel cell units are one or more of are a cathode gas delivery line, a cold-start gas delivery line, a cathode off-gas return line and an anode off-gas return line. Fuel cell systems of this type are used, for example, as an energy supply for electric vehicles.

Delivery or discharge of gas streams by a gas stream propelling means are provided in conventional fuel cell systems; usually by fans, blowers, ventilators and compressors. In other fields, however, it is known to use Coanda flow amplifiers. By supplying a driving flow medium at relatively high pressure and in a relatively small amount, such flow amplifiers can drive a flow of a second flow medium at relatively low pressure but high volume flow rate by exploiting the Coanda effect. To this end the Coanda flow amplifier designed in the form of a nozzle gap has a suitable internal or alternatively external flow wall surface for a wall-hugging flow of the drive medium supplied at elevated pressure.

Coanda flow amplifiers of this type are commercially available, for example, from EXAIR Corp. as air flow amplifiers and also from other suppliers under the description of "air amplifiers". Their delivered air flow can be used for cooling, drying, cleaning or ventilation, or their aspirated air flow can be used for the extraction of off-gases, vapors, smoke and dusts.

International patent document WO 98/32964 discloses an internal combustion engine with exhaust gas recirculation, in which the exhaust gas return line has a Coanda flow amplifier connected, via its high-pressure connection, to the compressed-air source of a compressed-air braking system of a motor vehicle. A special design of a Coanda flow amplifier to generate a helical fluid flow is disclosed in European patent document EP 0 456 931 B1.

One object of the present invention is to provide a fuel cell system of the type first mentioned above, which operates with relatively few components requiring electrical actuation.

These and other objects and advantages are achieved by the fuel cell system according to the invention, which is equipped with one or more Coanda flow amplifiers.

In one embodiment of the invention, a Coanda flow amplifier is provided in a purge gas line via which purge air can be introduced into a fuel cell box and discharged therefrom in order to ventilate said box.

In another embodiment of the invention, a Coanda flow amplifier is disposed in a delivery line to supply a cathode-side gas stream to the fuel cell and/or in a delivery line via which a cold-start gas is supplied to the at least one fuel cell unit. The cold-start gas feeds a cold-start component which brings the system to operating temperature as rapidly as possible in the event of a cold start.

In still another embodiment, a Coanda flow amplifier is provided in a cathode off-gas return line which recirculates at least part of the cathode off-gas to the cathode inlet side, thereby improving the water balance of the system.

In yet another embodiment, a Coanda flow amplifier is disposed in an anode off-gas return line and is connected, via a compressed-gas inlet, to a gas reservoir in which fuel (e.g., hydrogen) is stored under pressure.

In a refinement of the invention, the Coanda gas amplifier disposed in the cathode gas delivery line and/or cold-start gas delivery line has a high-pressure compressor connected to it on its upstream side. The compressor pressurizes the drive gas, which is used for gas amplification in the Coanda flow amplifier, to an adequate pressure.

Other objects, advantages and novel features of the present invention will become apparent from the following detailed description of the invention when considered in conjunction with the accompanying drawings.

DETAILED DESCRIPTION OF THE DRAWINGS

Figure 1:
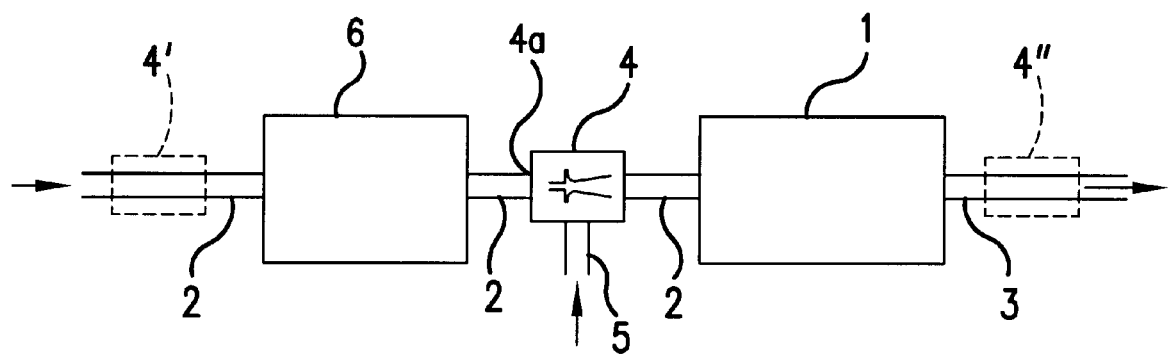
FIG. 1 shows a schematic block diagram of a fuel cell system comprising a ventilatable fuel cell box, and a Coanda flow amplifier in the associated purge air line.

FIG. 1 illustrates a fuel cell system comprising one or more fuel cell units or modules (not shown separately) arranged in a surrounding, virtually completely closed fuel cell enclosure 1. Associated with this enclosure 1 are ventilation means by which it can be ventilated with purge air, particularly to avoid accumulation of any hydrogen within the enclosure volume, which might escape from a fuel cell module as a result of a leak.

To this end, the enclosure ventilating means comprise a purge gas delivery line 2 which is connected to the enclosure 1, and a purge gas outlet line 3 which issues from the enclosure 1 at the opposite side or at a suitable location. Disposed in the purge gas delivery line 2 is a Coanda flow amplifier 4 which, on its high pressure side, is connected to a compressed-air line 5 via which purge air can be supplied e.g. in the form of leakage air of the system or transfer air of a high-pressure compressor of the system or from some other compressed-air source of the system. As a result of the Coanda effect of the compressed air fed in, the Coanda flow amplifier 4 on its suction side 4a aspirates purge air from the environment at a high volume flow rate. In the example shown, a further enclosure 6 provided in the purge gas delivery line 2 upstream of the Coanda flow amplifier 4 accommodates peripheral components of the fuel cell system, and is similarly ventilated by the gas flow.

As an alternative to the arrangement of the Coanda flow amplifier 4 between the two enclosures 1, 6 as shown in FIG. 1, it is possible to provide a Coanda flow amplifier 4' in the section of the purge gas delivery line 2 upstream of the peripheral enclosure 6, or for a Coanda flow amplifier 4" to be provided in the purge gas outlet line 3 of the fuel cell enclosure 1, as shown by dashed lines in FIG. 1 in each instance. In any case, accumulation of leaked hydrogen in the fuel cell enclosure 1 and consequently in the fuel cell modules arranged therein can be effectively prevented by purging with air. Such purging can be driven solely by the Coanda flow amplifier 4, 4', 4", without necessity of electric flow propelling components.

The arrangement of the enclosures 1 and 6 can also be transposed.

Figure 2:
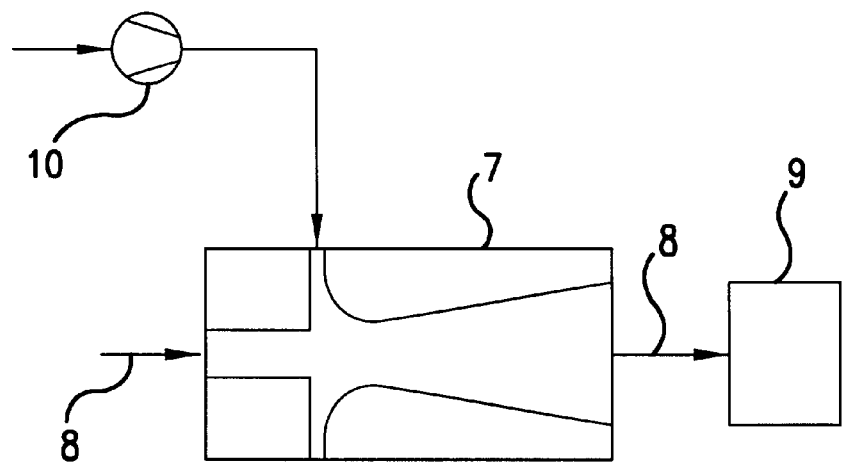
FIG. 2 is a schematic depiction of the use of a Coanda flow amplifier for a cold-start component of a fuel cell system.

FIG. 2 illustrates the use of a Coanda flow amplifier 7 for the purpose of amplifying a cold-start gas stream 8 which is supplied to a cold-start component 9 of a fuel cell system to bring the system to operating temperature as rapidly as possible in the event of a cold start, as will be familiar per se to those skilled in the art. This may involve e.g. an increased cathode air supply and/or the delivery of a gas mixture to be used specifically during the cold-start phase. In the example shown, amplification of the cold-start gas stream 8 by the Coanda flow amplifier 7 is effected by supplying the high-pressure side of the flow amplifier with ambient air compressed to a sufficiently high pressure by a high-pressure compressor 10. Particularly for relatively small fuel cell systems, cathode air delivery even in the warmed-up system state can be effected, if required, solely by means of the arrangement of FIG. 2, the Coanda flow amplifier 7 then assuming the function of a conventional cathode inlet air compressor.

Figure 3:
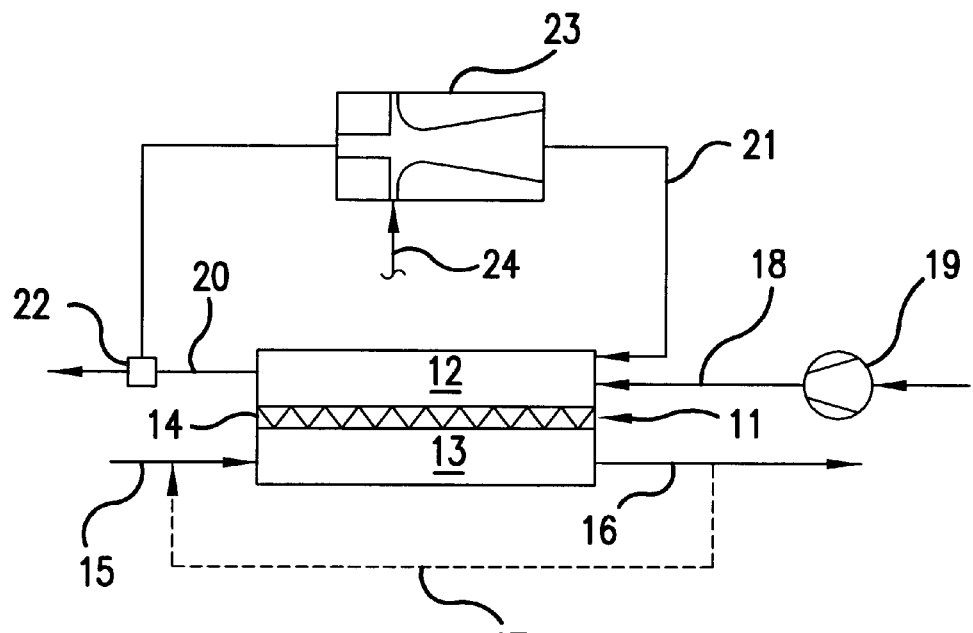
FIG. 3 is a schematic depiction of a fuel cell with partial cathode off-gas recirculation driven by a Coanda flow amplifier.

FIG. 3 schematically illustrates a fuel cell 11 having a cathode side 12, an anode side 13 and an intermediate membrane 14. The anode side is supplied, via a fuel gas delivery line 15, with a fuel gas, e.g. hydrogen. The anode off-gas discharged via an outlet line 16 can, if required, be recirculated at least in part to the anode inlet side, as indicated by an anode off-gas return line 17 shown by a dashed line.

The cathode side 12 is supplied, under pressure, with ambient fresh air via a delivery line 18 and a compressor 19. In addition, part of the cathode off-gas exiting via a cathode off-gas line 20 is recirculated to the cathode inlet side. For this purpose, a corresponding cathode off-gas return line 21 branches off from the cathode off-gas line 20 via a switchable valve 22. Disposed in the cathode off-gas return line 21 is a Coanda flow amplifier 23 which, on its high-pressure side, is connected to a compressed-air line 24 of a compressed-air source (not shown in any detail) of the system.

In this implementation of the system, the Coanda flow amplifier 23 effects gas flow propulsion, by metering in compressed air, for the cathode off-gas to be recirculated. Thus, this function of the fuel cell system likewise does not absolutely depend on electrically fed flow propulsion components. Such partial cathode offgas recirculation improves the water balance of the system on the cathode side.

Figure 4:
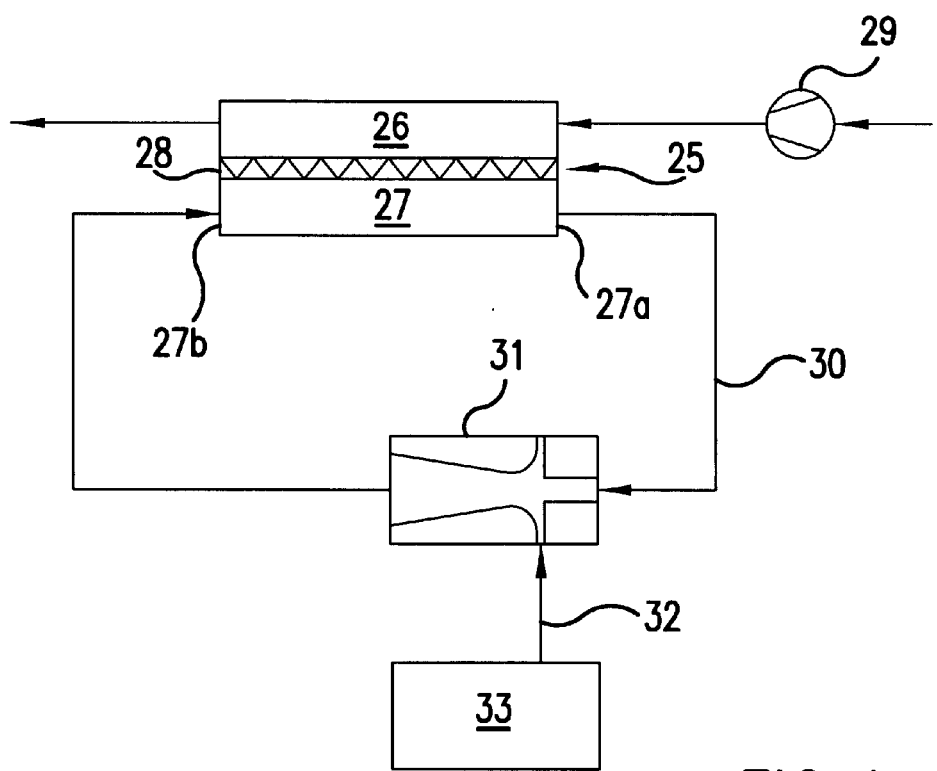
FIG. 4 is a schematic depiction of a fuel cell with anode gas circulation driven by a Coanda flow amplifier.

FIG. 4 again schematically shows a fuel cell 25 having a cathode side 26, an anode side 27 and intermediate membrane 28. The cathode side 26 is again fed with ambient air at high pressure via a compressor 29. On the anode side, in this example, the anode off-gas exiting on the anode gas outlet side 27a is recirculated via an anode gas return line 30 to the anode inlet side 27b. Disposed in the anode gas return line 30 is a Coanda flow amplifier 31. The latter is connected, on its high-pressure side, via a fuel gas delivery line 32, to a fuel gas pressure vessel 33 in which the fuel gas used, e.g. hydrogen, is stored under pressure. The hydrogen can be gaseous or liquid.

During operation, the fuel gas passes, under sufficient pressure, from the pressure vessel 33 to the Coanda flow amplifier 31, where it propels the recirculated anode gas stream and is metered into the circulating anode-side gas stream of the fuel cell 25. The Coanda flow amplifier 31 in this case eliminates the need for electric fuel gas metering-in components.

Initial trials of Coanda flow amplifiers at the inventive locations of a fuel cell system such as illustrated in the above-described specific embodiments, show surprisingly good efficacy, which generally allows electric flow propulsion components such as fans, blowers and ventilators to be dispensed with at that particular location. When used in potentially explosive atmospheres, this has the additional beneficial effect that no elaborate safety measures are required. Moreover, cabling and control arrangements normally required for electric flow propulsion components can also be dispensed with.

The failure risk of Coanda flow amplifiers is extremely low, as they do not include any moving parts. As a further advantage, contaminants of the medium such as e.g. water droplets, do not have any significant effect on the mode of operation of a Coanda flow amplifier. The Coanda flow amplifier usually permits the propelled gas mass stream to be amplified by a factor of from 10 to 30. It is apparent that, depending on application, the fuel cell system can be equipped with a plurality of Coanda flow amplifiers at the positions illustrated in FIGS. 1 to 4.

Moreover it is possible for the fuel cell system to be provided not only with the fuel cell enclosure, but also other housings or enclosures in which components of the fuel cell system are accommodated jointly. There too ventilation means can be provided which advantageously include a Coanda flow amplifier in order to purge locations or enclosures subject to explosion hazards. For example, the Coanda flow amplifier can also be employed in the field of peripheral units of the fuel cell and/or in the field of off-gas cleaning of the fuel cell system outside the fuel cell enclosure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system comprising:

a fuel cell enclosure;

at least one fuel cell unit inserted into the fuel cell enclosure;

an enclosure ventilating arrangement including a purge gas delivery line connected to the fuel cell enclosure, a purge gas outlet line which issues from the fuel cell enclosure, and a Coanda flow amplifier disposed in one of the purge gas delivery line and the purge gas outlet line.

2. The fuel cell system according to claim 1, further comprising:

a ventilating arrangement for a housing outside the fuel cell enclosure, in which housing are components of the fuel cell system, said ventilating means including a Coanda flow amplifier.

3. A fuel cell system claim 1, comprising:

at least one fuel cell unit having at least one of an associated cathode-gas delivery line and a cold-start gas delivery line; and a Coanda flow amplifier disposed in at least one of the cathode gas delivery line and the cold-start gas delivery line.

4. A fuel cell system according to claim 3, further comprising:

a high-pressure compressor disposed upstream of the Coanda flow amplifier on a high-pressure side thereof.

5. A fuel cell system comprising:

at least one fuel cell unit having an associated cathode off-gas return line for at least partial recirculation of cathode off-gas to a cathode inlet side; and a Coanda flow amplifier disposed in the cathode off-gas return line and having its high-pressure side connected to a compressed-air line.

6. A fuel cell system comprising:

at least one fuel cell unit having an associated anode off-gas return line;

a Coanda flow amplifier disposed in an anode off-gas return line and having its high-pressure side connected to a fuel gas reservoir.

\* \* \* \* \*